(12) United States Patent
Feuz et al.

(10) Patent No.: US 11,995,119 B2
(45) Date of Patent: May 28, 2024

(54) PRIVACY CONTROLS FOR SHARING EMBEDDINGS FOR SEARCHING AND INDEXING MEDIA CONTENT

(71) Applicant: Google LLC, Mountain View, CA (US)

(72) Inventors: Sandro Feuz, Zürich (CH); Thomas Deselaers, Zürich (CH)

(73) Assignee: GOOGLE LLC, Mountain View, CA (US)

( * ) Notice: Subject to any disclaimer, the term of this patent is extended or adjusted under 35 U.S.C. 154(b) by 707 days.

(21) Appl. No.: 17/142,974

(22) Filed: Jan. 6, 2021

(65) Prior Publication Data

US 2021/0209248 A1 Jul. 8, 2021

Related U.S. Application Data

(63) Continuation of application No. PCT/US2020/012352, filed on Jan. 6, 2020.

(51) Int. Cl.
*G06F 16/53* (2019.01)
*G06F 16/41* (2019.01)
(Continued)

(52) U.S. Cl.
CPC .............. *G06F 16/53* (2019.01); *G06F 16/41* (2019.01); *G06F 16/438* (2019.01); *G06F 16/73* (2019.01);
(Continued)

(58) Field of Classification Search
CPC ........ G06F 16/53; G06F 16/438; G06F 16/41; G06F 16/73; G06F 21/602; G06F 21/6245; G06N 20/00; G06V 40/172
See application file for complete search history.

(56) References Cited

U.S. PATENT DOCUMENTS 10,027,727 B1 * 7/2018 Ozog ................... G06V 40/172
10,157,293 B2   12/2018 Woss et al.
(Continued)

FOREIGN PATENT DOCUMENTS

| JP | 2014/032656 | 2/2014 |
|----|-------------|--------|
| JP | 2016/505933 | 2/2016 |
| JP | 2016/139387 | 8/2016 |

OTHER PUBLICATIONS

Hirayama, Kosuke, Sachio Saiki, and Masahide Nakamura. Developing real-time face identification device composable with distributed applications. Springer International Publishing, 2019 (Year: 2019).*

(Continued)

*Primary Examiner* — Mohsen Almani
(74) *Attorney, Agent, or Firm* — DORITY & MANNING P.A.

(57) ABSTRACT

This document describes techniques and systems that enable privacy controls for sharing embeddings for searching and indexing media content. A set of images of a user's face are obtained and a machine-learned model is applied to the set of images to generate a user-specific dataset of face embeddings for the user. Media content stored in a media storage is indexed by applying the machine-learned model to the media content to provide indexed media information identifying one or more faces shown in the media content. Access to the indexed media information by another user querying the media content for images or videos depicting the user is controlled based on a digital key shared by the user with the other user, where the digital key is associated with the user-specific dataset and the user-specific dataset is usable to identify the images or videos depicting the user.

19 Claims, 10 Drawing Sheets

(51) Int. Cl.

| | |
|---|---|
| G06F 16/438 | (2019.01) |
| G06F 16/73 | (2019.01) |
| G06F 16/951 | (2019.01) |
| G06F 21/32 | (2013.01) |
| G06F 21/60 | (2013.01) |
| G06F 21/62 | (2013.01) |
| G06N 3/045 | (2023.01) |
| G06N 20/00 | (2019.01) |
| G06V 40/16 | (2022.01) |

(52) U.S. Cl.
CPC ........ *G06F 21/602* (2013.01); *G06F 21/6245* (2013.01); *G06N 20/00* (2019.01); *G06V 40/172* (2022.01)

(56) References Cited

U.S. PATENT DOCUMENTS

| | | | | |
|---|---|---|---|---|
| 10,157,324 | B2 | 12/2018 | Aguera-Arcas | |
| 10,990,246 | B1* | 4/2021 | Law | G06V 40/103 |
| 2007/0172155 | A1* | 7/2007 | Guckenberger | G06F 16/583 |
| | | | | 707/E17.02 |
| 2008/0127331 | A1* | 5/2008 | Seidman | H04L 9/083 |
| | | | | 726/21 |
| 2009/0037419 | A1* | 2/2009 | Huber | G06F 21/36 |
| | | | | 707/999.009 |
| 2009/0252383 | A1* | 10/2009 | Adam | G06V 40/16 |
| | | | | 715/810 |
| 2011/0282906 | A1* | 11/2011 | Wong | G06F 16/7837 |
| | | | | 707/E17.03 |
| 2011/0305374 | A1 | 12/2011 | Chou | |
| 2014/0161326 | A1* | 6/2014 | Ganong | G06Q 30/0269 |
| | | | | 382/118 |
| 2017/0286433 | A1* | 10/2017 | Raichelgauz | G06N 5/00 |
| 2018/0046855 | A1* | 2/2018 | Ganong | G06V 40/171 |
| 2018/0337994 | A1* | 11/2018 | Dachille | G06F 3/04842 |
| 2019/0138843 | A1* | 5/2019 | Mintz | H04N 1/32101 |
| 2019/0188285 | A1 | 6/2019 | Scheau et al. | |
| 2019/0222602 | A1 | 7/2019 | Linder | |
| 2019/0311182 | A1 | 10/2019 | Mishra et al. | |
| 2021/0117780 | A1* | 4/2021 | Malik | G06F 9/453 |
| 2022/0004652 | A1* | 1/2022 | Cui | G06F 16/51 |

OTHER PUBLICATIONS

Aditya, Paarijaat, et al. "I-pic: A platform for privacy-compliant image capture." Proceedings of the 14th annual international conference on mobile systems, applications, and services. 2016 (Year: 2016).*
Zhang, Xinpeng. "Reversible data hiding in encrypted image." IEEE signal processing letters 18.4 (2011): 255-258 (Year: 2011).*
"International Search Report and Written Opinion", PCT Application No. PCT/US2020/012352, dated Oct. 1, 2020, 15 pages.
Guo, et al., "Towards Efficient Privacy-Preserving Face Recognition in the Cloud", Signal Processing 2019, 9 pages.
Li, et al., "HideMe: Privacy-Preserving Photo Sharing on Social Networks", IEEE Infocom 2019—IEEE Conference on Computer Communications, 9 pages.
Wang, et al., "Face Search at Scale", IEEE Transactions on Pattern Analysis and Machine Intelligence, vol. 39, No. 6, Jun. 2017, 15 pages.
International Preliminary Report on Patentability for Application No. PCT/US2020/012352, dated Jul. 21, 2022, 9 pages.

* cited by examiner

PRIVACY CONTROLS FOR SHARING EMBEDDINGS FOR SEARCHING AND INDEXING MEDIA CONTENT

CROSS-REFERENCE TO RELATED APPLICATION

This application is a continuation application of, and claims priority to, International Application No. PCT/US2020/012352, filed Jan. 6, 2020, the disclosure of which is incorporated in its entirety by reference herein.

BACKGROUND

Deep-learning models can generate embeddings for different types of inputs, such as multiple input images of a face of a given user. An embedding is an n-dimensional vector that represents an image and can be used by machine-learning techniques to represent the visual appearance of a person based on multiple images of said person. Embeddings can be used in a variety of different applications to create a model usable to identify the person in media content, such as images, videos, or audio content. Depending on the application, embeddings can be used to capture, e.g., a user's face, the user's body, the user's fingerprint, or even the user's voice. While these embeddings are a powerful tool, they can identify sensitive data of the user.

SUMMARY

This document describes techniques and systems that enable privacy controls for sharing embeddings for searching and indexing media content. The techniques described herein allow a user to give access to searching and indexing features based on an embedding of the user's face to a limited, whitelisted set of users and subsequently revoke the access from one or more of those users.

The techniques and systems include a method that controls privacy for sharing embeddings for searching and indexing media content. The method includes obtaining a set of images of a first user's face and applying a machine-learned model to the set of images to generate a user-specific dataset of face embeddings for the first user. Then, media content stored in a media storage is indexed based on the user-specific dataset to provide indexed information identifying one or more faces shown in the media content. Access to the indexed information by a second user querying the media content for images or videos depicting the first user is controlled based on a digital key shared by the first user with the second user, where the digital key is associated with the user-specific dataset and the user-specific dataset is usable to identify the images or videos depicting the first user.

The digital keys may be stored only "in the cloud," such as at a service provider system or other secure online storage associated with the service provider system, and not stored at the user's devices. The service provider system may provide online storage of personalized media collections for users. These personalized media collections may be account-based and securely encrypted. In such an implementation, the user can provide user credentials to log in to their account and then initiate the search query through the service provider system based on their account. In this way, shared digital keys are not shared with any actual user devices and may therefore be kept more secure from counterfeits and copies. Further, a personalized media collection that is searchable for a particular user may be tied to the account of that user, which protects other media collections from unauthorized searches.

Users' personalized media collections may be indexed, and the service provider system may store indexed information for each media collection separately. Keeping different users' indexed information separately stored can provide an additional level of security against unauthorized access (e.g., permitted access to a first user's indexed information gaining unauthorized access to a second user's indexed information).

This summary is provided to introduce simplified concepts concerning privacy controls for sharing embeddings for searching and indexing media content, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of privacy controls for sharing embeddings for searching and indexing media content are described in this document with reference to the following drawings. The same numbers are used throughout the drawings to reference like features and components.

DETAILED DESCRIPTION

Overview

This document describes techniques and systems that enable privacy controls for sharing embeddings for searching and indexing media content. Sharing embeddings of a user, such as face embeddings, can allow another user to detect the face of the user in arbitrary data, which may not be desirable. For example, a leaked embedding may allow anyone using it to detect the user's face in public video streams. The techniques described in this document provide a software-based solution to control access to searching for a particular user depicted in media content. In particular, the techniques allow a user to give access to searching and indexing features based on an embedding of the user's face to a limited, whitelisted set of users and subsequently revoke access to one or more of the users.

In aspects, a method for privacy controls for face-embedding sharing for searching and indexing media content is described. The method is performed by a service provider system obtaining a set of images of a face of a first user and applying a machine-learned model to the set of images to generate a user-specific dataset of face embeddings for the first user. The method also includes the service provider system indexing media content stored in a media storage by applying the machine-learned model to the media content to provide indexed information identifying one or more faces shown in the media content. Additionally, the method includes the service provider system controlling, by an application programming interface, access to the indexed information by a second user querying the media content for images or videos depicting the first user. The access is controlled based on a digital key shared by the first user with the second user. The digital key is associated with the user-specific dataset. The user-specific dataset is usable with the indexed information to identify the images or videos in the media content that depict the first user.

These are but a few examples of how the described techniques and devices may be used to enable privacy controls for face-embedding sharing or searching and indexing media content. Other examples and implementations are described throughout this document. The document now turns to an example operating environment, after which example devices, methods, and systems are described.

Operating Environment

Figure 1:
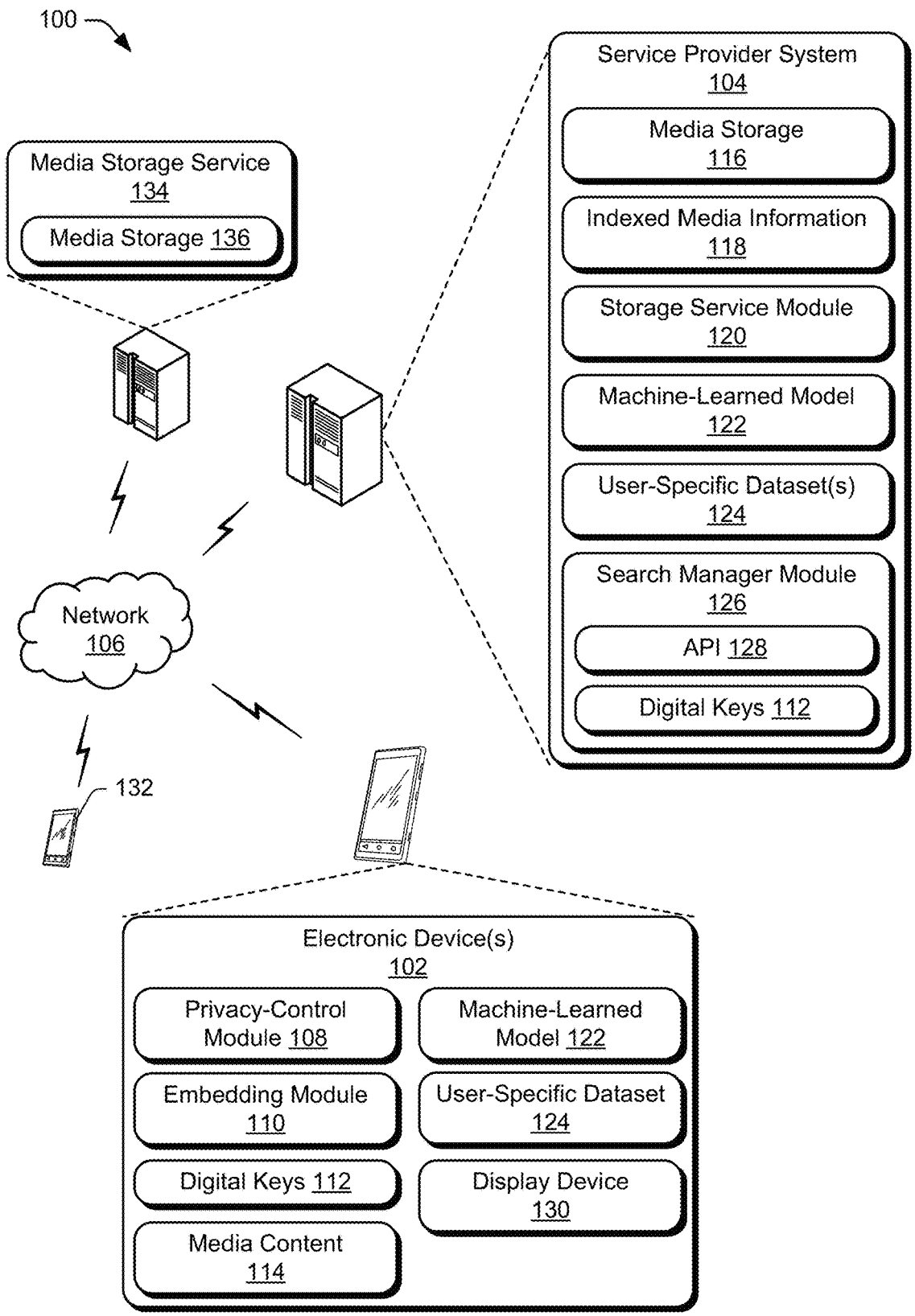
FIG. 1 illustrates an example environment in which techniques for privacy controls for sharing embeddings for searching and indexing media content can be implemented.

FIG. 1 illustrates an example environment 100 in which techniques enabling privacy controls for face-embedding sharing for searching and indexing media content can be implemented. The example environment 100 includes an electronic device 102 (e.g., a user device) configured to communicate with a service provider system 104 via a network 106. The electronic device 102 includes a privacy-control module 108, an embedding module 110, one or more digital keys 112, and media content 114.

The service provider system 104 is illustrated as including media storage 116, indexed media information 118, a storage service module 120, a machine-learned model 122, one or more user-specific datasets 124, and a search manager module 126. The storage service module 120 can apply the machine-learned model 122 to media content 114 provided by the electronic device 102 (e.g., image data, video data, audio data, etc.). The machine-learned model 122 (e.g., a convolutional neural network) is trained using machine-learning techniques to generate embeddings from the media content 114 to create a user-specific dataset 124 for a user depicted in the media content 114. For example, the media content 114 may include a set of images of a user, such as a face of the user of the electronic device 102. The storage service module 120 can run a general purpose face detect algorithm to detect a face boundary of the face in the images. Then, using the machine-learned model 122, the storage service module 120 computes embeddings (also referred to as embedding vectors) for substantially all the faces found in the images to create the user-specific dataset 124 for the user. The user-specific dataset 124 is one or more n-dimensional vectors representing the user's face. The user-specific dataset 124 is stored "in the cloud" securely encrypted for the user and inaccessible by other devices.

The storage service module 120 can index the media storage 116 by identifying users who appear in it, such as in images or videos in the media storage 116, to generate the indexed media information 118. For security, the storage service module 120 only identifies those users who have consented and have opted to store their user-specific dataset 124 in the cloud (e.g., at the service provider system 104). It is noted that access to the user-specific dataset 124 is not allowed to any other user or device without the user's consent.

The user of electronic device 102 can initiate a search query to the service provider system 104 to search for images of the user in the media storage 116. The electronic device 102 calls an application programming interface (API) 128 at the search manager module 126 to access the indexed media information 118 and search for embedding information that substantially matches the user-specific dataset 124 of the user. Based on matching embedding information, the search manager module 126 can locate corresponding images in the media storage 116 that depict the user. Resulting images are then presented at the electronic device 102 in a display application via the display device 130.

The user of the electronic device 102 may share access to the indexed media information 118 corresponding to the user to one or more other users (e.g., family, friends, etc.). This allows the other users to query the media storage 116 with user-specific queries. In an example, user-B initiates a user-specific query, at their user device 132, to find images of user-A (user of electronic device 102) in the media storage 116 of the service provider system 104. However, neither the machine-learned model 122 nor the user-specific dataset 124 is shared with the user-B. Instead, the user-B has a digital key, previously provided by the user-A, corresponding to the user-specific dataset 124 of the user-A. The user-B provides the digital key to the search manager module 126. The API 128 of the search manager module 126 uses the digital key to identify the user-specific dataset 124 of the user-A. The API 128 compares the embeddings in the user-specific dataset 124 of the user to the indexed media information 118 to identify matching embeddings and index information corresponding to the matching embeddings. The API 128 uses the identified index information to locate corresponding images or videos, from the media storage 116, which depict user-A. The API 128 can then return the corresponding images to the user device 132 of the user-B for display.

In some aspects, the user-B may wish to query a different image or video corpus with user-specific queries of the user-A. For example, the user-B may query a media storage service 134 for images of the user-A in the media storage 136. Alternatively, the user-B may query local storage (not shown) at the user device 132. In either case, the user-B initiates a query to the API 128, with the query including the digital key shared by the user-A and identification of the location of the particular image or video corpus to search (e.g., the media storage 136 or local storage of the user device 132). If these corpuses have not yet been indexed by the storage service module 120, the API 128 applies (or calls the storage service module 120 to apply) the machine-learned model 122 to the particular image or video corpus to index the content. The storage service module 120 of the service provider system 104 retains the resulting indexed information in the indexed media information 118. The search manager module 126 can then compare the resulting indexed information to the user-specific dataset 124 to identify which images in the particular image or video corpus (e.g., the media storage 136 or local storage of the user device 132) include the user-A and provide results to the user device 132 for the user-B.

In some aspects, the electronic device 102 may include the machine-learned model 122, or an instance of the machine-learned model 122. The embedding module 110 can apply the machine-learned model 122 to a set of images captured and/or stored by the electronic device 102 in the media content 114 to generate the user-specific dataset 124 (e.g., set of embeddings). In some aspects, the set of images may be images captured using a near-infrared camera, such as by a face authentication system (e.g., face unlock application) that captures near-infrared image data of the user's face and generates embeddings (n-dimensional numerical vectors) representing the user's unique facial features in a numerical fashion without including personally-identifiable information. Then, the electronic device 102 can transmit (e.g., upload) the embeddings (e.g., the user-specific dataset 124) to the service provider system 104 to store it "in the cloud." In one example, the electronic device 102 or the service provider system 104 can create a three-dimensional (3D) representation of a face to then use as input data for the face embeddings.

The privacy-control module 108 is configured to generate the digital keys 112 for sharing with authorized users. Only the authorized users who have a shared key (e.g., digital key 112) can call the API 128 to access the indexed media information 118 to identify particular images or videos, from an image or video corpus, depicting the user.

Because the user-specific dataset 124 is not exposed directly to other users (the only access granted to other users is to the indexed content for search queries), the granted access can be revoked. The user-A of the electronic device 102 can select to revoke the shared access by deleting the digital key previously shared with a particular user (e.g., the user-B). Then, the next time that the user-B initiates a search for images or videos depicting the user-A, no results are provided.

Throughout this disclosure examples are described where a computing system (e.g., the electronic device 102, a client device, a server device, the service provider system 104, a computer, or other type of computing system) may analyze information (e.g., radar, inertial, and facial-recognition sensor data, images) associated with a user, such as the just-mentioned face images. The computing system, however, can be configured to only use the information after the computing system receives explicit permission from the user of the computing system to use the data. The individual users may have constant control over what programs can or cannot do with sensor data. For example, before the electronic device 102 shares sensor data with another device (e.g., to train a model executing at another device), the electronic device 102 may pre-treat the sensor data to ensure that any user-identifying information or device-identifying information embedded in the data is removed. Thus, the user may have control over whether information is collected about the user and the user's device, and how such information, if collected, may be used by the computing device and/or a remote computing system.

Although the examples described herein are directed to image data depicting the user's face, the techniques described herein can also be implemented on other types of data to generate a corresponding embedding, which can be used to search media content for data corresponding to the user. Some example other types of input may include voice data, substantial full-body images, fingerprint data, iris-scan data, video data, and so forth. Embeddings generated from voice data can be used to find videos or audio files, or audio segments within the videos or audio files, of the user speaking. In one example, these techniques can be used to identify when, during a recorded meeting, a particular person speaks or who is speaking at different times during the meeting. Embeddings generated from full-body images of a user can be used to identify a user based on their gait or how they move. These techniques can also be used for face authentication. For example, if a company uses face authentication and has the user-specific dataset for the user, then a digital key can be given to the user to access the API with face scanning to enter a secure building. In yet another example, using these techniques, a user may not be required to train a new electronic device for a face unlock application. Rather, a digital key can be provided to the new electronic device, which allows the new electronic device to call the API to access to the user-specific dataset for authenticating the user for face unlock.

Figure 2:
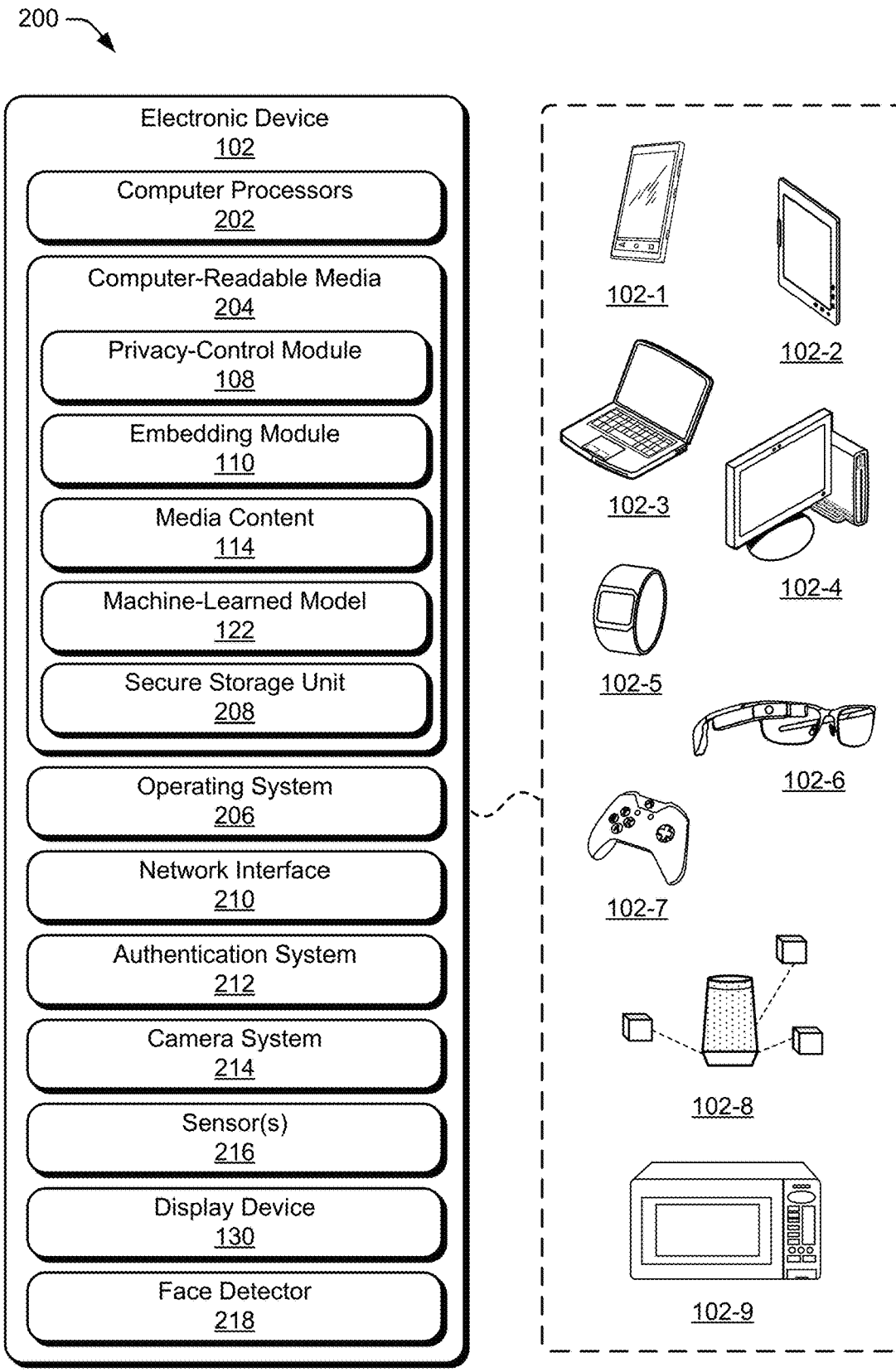
FIG. 2 illustrates an example implementation of the electronic device that can implement privacy controls for sharing embeddings for searching and indexing media content.

In more detail, consider FIG. 2, which illustrates an example implementation 200 of the electronic device 102 that can implement privacy controls for face-embedding sharing for searching and indexing media content. The electronic device 102 of FIG. 2 is illustrated with a variety of example devices, including a smartphone 102-1, a tablet 102-2, a laptop 102-3, a desktop computer 102-4, a computing watch 102-5, computing spectacles 102-6, a gaming system 102-7, a home-automation and control system 102-8, and a microwave 102-9. The electronic device 102 can also include other devices, such as televisions, entertainment systems, audio systems, automobiles, drones, track pads, drawing pads, netbooks, e-readers, home security systems, and other home appliances. Note that the electronic device 102 can be wearable, non-wearable but mobile, or relatively immobile (e.g., desktops and appliances).

The electronic device 102 also includes one or more computer processors 202 and one or more computer-readable media 204, which includes memory media and storage media. Applications and/or an operating system 206 implemented as computer-readable instructions on the computer-readable media 204 can be executed by the computer processors 202 to provide some or all of the functionalities described herein. For example, the computer-readable media 204 can include the privacy-control module 108, the embedding module 110, the media content 114, the machine-learned model 122, and a secure storage unit 208. The embedding module 110 can call the machine-learned model 122. The privacy-control module 108 can control (e.g., grant, revoke) access to the digital keys 112, which authorize user-specific searches in a media storage.

The secure storage unit 208 is configured to store security data (e.g., user credentials) used for privacy controls, such as controls to unlock the electronic device 102 (including face authentication data, password/passcode information, fingerprint data, and so on). Although this security data can be used to authenticate the user to unlock the electronic device 102 using face authentication, password/passcode authentication, fingerprint authentication, voice authentication, and so on, personal information about the user cannot be obtained by the security data. Specifically, the user cannot be identified by the security data. Rather, the security data is used to simply determine whether data received from a user attempting to unlock the phone matches stored profile data (e.g., the user-specific dataset 124) representing a user that set up the security on the electronic device 102. In an example, the embeddings generated from captured images of the user's face are numerical vector representations of facial features of the user. These embeddings are simply used for comparison to new embeddings, generated from images captured during a face-authentication attempt, to locate a match. In other implementations, these embeddings are used for comparison to new embeddings generated from images depicting the user's face, captured by a camera of the electronic device 102 or stored in the media content 114 (obtained from another device).

The electronic device 102 may also include a network interface 210. The electronic device 102 can use the network interface 210 for communicating data over wired, wireless, or optical networks. By way of example and not limitation, the network interface 210 may communicate data over a local-area-network (LAN), a wireless local-area-network (WLAN), a personal-area-network (PAN), a wide-area-network (WAN), an intranet, the Internet, a peer-to-peer network, point-to-point network, or a mesh network.

Various implementations of the authentication system 212 can include a System-on-Chip (SoC), one or more Integrated Circuits (ICs), a processor with embedded processor instructions or configured to access processor instructions stored in memory, hardware with embedded firmware, a printed circuit board with various hardware components, or any combination thereof In an example, the authentication system 212 can, in a secure mode, compare authentication data received from the user to security data stored in the secure storage unit 208 for authenticating the user to unlock the electronic device 102. In some aspects, the authentication system 212 generates the authentication data using image data obtained from the camera system and provides the authentication data to the secure storage unit 208 to enable the secure storage unit 208 to compare the authentication data to the stored security data and determine if there is a match.

The electronic device 102 also includes a camera system 214 implemented to capture image data. The image data may be usable to generate a three-dimensional depth map of an object, such as a user's face. Any suitable camera system may be used, including a color camera (e.g., Red-Green-Blue (RGB) camera or a near-infrared (NIR) camera). The camera system 214 may be integrated into, or otherwise associated with, the electronic device 102. In aspects, the camera system 214 may be wirelessly connected to the electronic device 102.

The electronic device 102 can also include one or more sensors 216. The one or more sensors 216 can include any of a variety of sensors, such as an audio sensor (e.g., a microphone), a touch-input sensor (e.g., a touchscreen), an image-capture device (e.g., a camera or video-camera), proximity sensors (e.g., capacitive sensors), or ambient light sensors (e.g., a photodetector).

The electronic device 102 can also include the display device 130. The display device 130 can include any suitable display device, such as a touchscreen, a liquid crystal display (LCD), thin film transistor (TFT) LCD, an in-place switching (IPS) LCD, a capacitive touchscreen display, an organic light emitting diode (OLED) display, an active-matrix organic light-emitting diode (AMOLED) display, super AMOLED display, and so forth.

The electronic device 102 can also include a face detector 218. The face detector 218 can detect a face boundary of each of one or more faces in an image. By detecting the face boundary, the face detector 218 limits the amount of image data that is processed by the embedding module 110. In implementations, the face detector 218 can be implemented as computer-readable instructions on the computer-readable media 204 and executed by the computer processors 202 to detect a face boundary of respective faces in the image.

These and other capabilities and configurations, as well as ways in which entities of FIGS. 1 to 2 act and interact, are set forth in greater detail below. These entities may be further divided, combined, and so on. The environment 100 of FIG. 1, the implementations 200, 300, and 400 of FIGS. 2 through 4, and the detailed methods of FIG. 5 through FIG. 9 illustrate some of many possible environments and devices capable of employing the described techniques.

Figure 3:
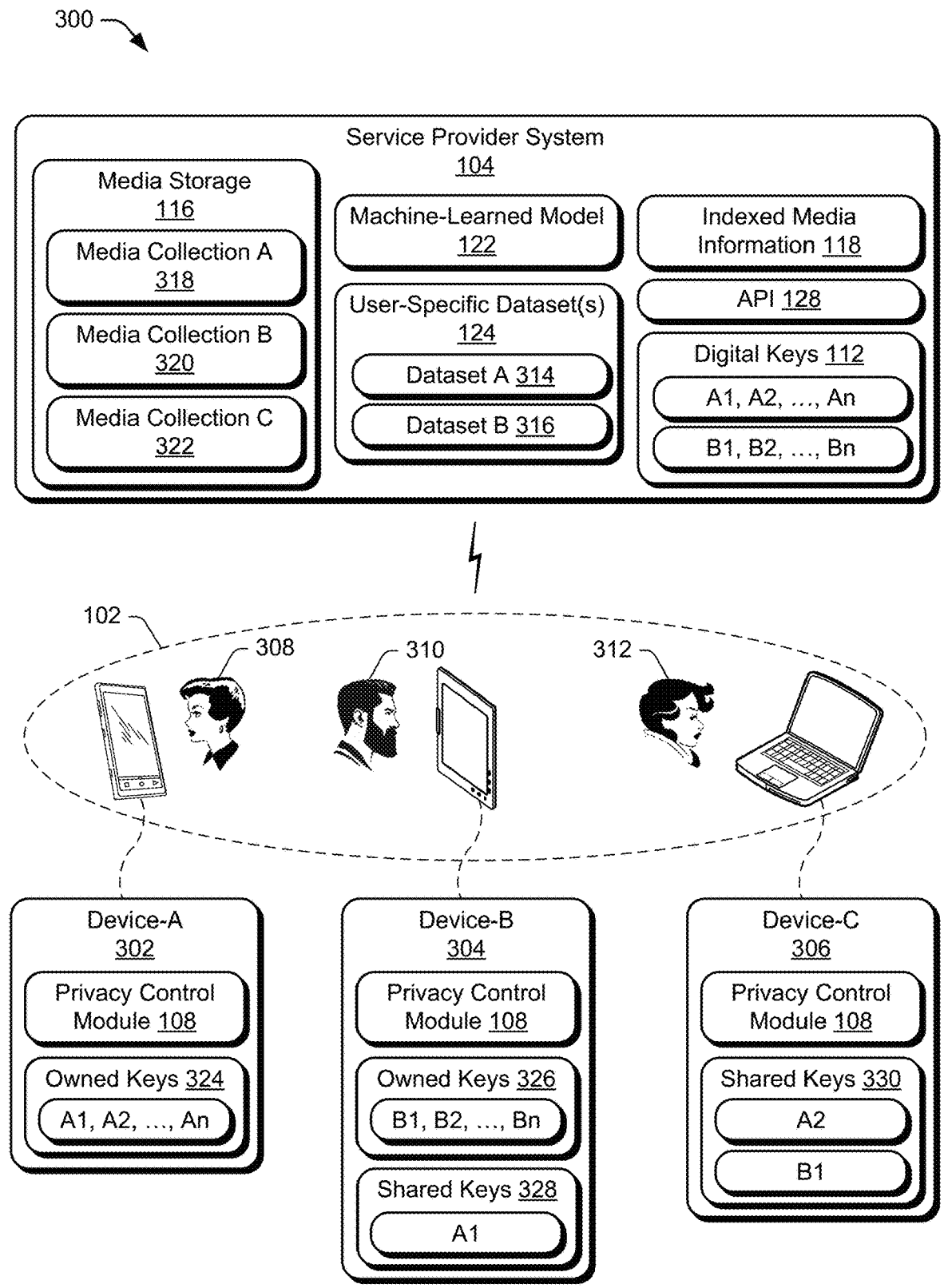
FIG. 3 illustrates an example implementation of privacy controls for sharing embeddings for searching and indexing media content.

FIG. 3 illustrates an example implementation 300 of privacy controls for sharing embeddings for searching and indexing media content. FIG. 3 illustrates the service provider system 104 and multiple electronic devices 102, e.g., device-A 302, device-B 304, and device-C 306. In the illustrated example, each of the devices corresponds to a different user, e.g., the device-A 302 corresponds to user-A 308, the device-B corresponds to user-B 310, and the device-C corresponds to user-C 312.

Each of the devices may be implemented with an instance of the privacy-control module 108 to control access to image or video searches of the corresponding user. In this example implementation 300, the user-A 308 of device-A 302 has selected to store a user-specific dataset 124 (e.g., dataset-A 314) at the service provider system 104. The dataset-A 314 is generated based on the machine-learned model 122 being applied to a set of images of the user-A 308, either provided by the device-A 302 or stored in the media storage 116 at the service provider system 104, or both.

The service provider system 104 provides online storage of personalized media collections for users. These personalized media collections may be account-based and securely encrypted in the media storage 116. Each user may have one or more personalized media collections, such as images and videos organized in different folders or subfolders. Because the personalized media collections are account-based, a user may log in to their account using any suitable electronic device and upload images and/or videos to create the personalized media collection. For simplicity of the illustrated example, each user is illustrated with one electronic device and one personalized media collection. For instance, the media storage 116 includes a media collection-A 318 uploaded by the user-A 308, a media collection-B 320 uploaded by the user-B 310, and a media collection-C 322 uploaded by the user-C 312.

To share access to a user-specific dataset 124 for searching for media content depicting the user, the corresponding privacy-control module 108 can provide a corresponding digital key 112. A new key is created for each user with whom access is shared (e.g., ten different keys generated for ten users, respectively). To revoke access for a particular user, privacy-control module 108 deletes their corresponding key. In the illustrated example, the device-A 302 and/or the service provider system 104 stores set of digital keys 112 (e.g., owned keys 324, which include keys A1, A2, . . . , An) for the user-A 308. Also, a set of digital keys 112 (e.g., owned keys 326, which include keys B1, B2, . . . , Bn) are stored by the device-B 304 and the service provider system 104. In some implementations, only the service provider system 104 stores the digital keys 112 for each user and management of the digital keys 112 is account-based, such that the user may log into their account at the service provider system 104 to manage shared keys.

As further illustrated, the user-A 308 has shared a first key A1 with the device-B 304 (illustrated by shared keys 328) and a second key A2 with the device-C 306 (illustrated by shared keys 330). Similarly, the device-B 304 has shared a key B1 with the device-C 306 but has not provided any keys to the device-A 302. In the illustrated example, the device-C 306 does not own any keys because the user-C 312 has not chosen to store a user-specific dataset at the service provider system 104 and, thus, no digital keys have been generated for the device-C 306. Alternatively, the digital keys 112 may be stored only "in the cloud," such as at the service provider system 104 or other secure online storage associated with the service provider system 104, and not stored at the user's devices. In such an implementation, the user can provide user credentials to log in to their account and then initiate the search query through the service provider system 104 based on their account. In this way, the shared digital keys 112 are not shared with any user devices and may therefore be kept more secure from counterfeits and copies. Further, the media collection that is searchable for a particular user may be tied to the account of that user, which protects other media collections from unauthorized searches.

Assume the user-B 310 wishes to search their personalized media collection-B 320 for images and/or videos of the user-A 308. The user-B 310 inputs a search query to the device-B 304. The device-B 304 then calls the API 128 at the service provider system 104 and provides the shared key A1 and an indication of the media collection-B 320 to the API 128. If the media collection-B 320 has not yet been indexed, the API 128 can apply the machine-learned model 122 to the media collection-B 320 to generate corresponding indexed information. The service provider system 104 can store the corresponding indexed information in the indexed media information 118, separate from other indexed information corresponding to other media collections. Keeping different users' indexed information separately stored can provide an additional level of security against unauthorized access (e.g., permitted access to a first user's indexed information gaining unauthorized access to a second user's indexed information).

The API 128 uses the shared key A1 to access the dataset-A 314 of the user-A 308 and compare the embeddings in the dataset-A 314 against the indexed media information 118 corresponding to the media collection-B 320. If the API locates matching embeddings in the indexed media information 118 corresponding to the media collection-B 320, the API 128 identifies corresponding images and/or videos in the media collection-B 320 and returns those images and/or videos to the device-B 304 as results to the search query. The results do not identify which face or person in the images and/or videos is the user-A 308. Without such identifying information, the user-B 310 cannot build a copy of the dataset-A 314. The results only indicate images and/or videos that depict the user-A 308.

In some implementations, the service provider system 104 may use the results of the search query by the user-B 310 to update the dataset-A 314 for the user-A 308, even though the user-A 308 may not have access to the media collection-B 320 of the user-B 310. The larger the user-specific dataset 124, the more accurate the results of the user-specific search query may be.

The user-C 312 may initiate a search query for images with one or both of the user-A 308 and the user-B 310 because the shared keys 330 A2 and B1 have been shared with the device-C 306. Assume the user-C 312 initiates a search query for images of either the user-A 308 or the user-B 310. The privacy-control module 108 provides both keys A2 and B1 to the API 128, and the API 128 identifies the corresponding datasets (e.g., the dataset-A 314 and the dataset-B 316). The API 128 compares these datasets to the indexed media information 118 corresponding to the media collection-C 322 of the user-C 312. Based on matching embeddings, the service provider system 104 returns search results identifying images, from the media collection-C 322, that show one or both of the user-A 308 and the user-B 310.

Notice that the user-B 310 has not shared a digital key (e.g., one of the owned keys 326) with the user-A 308. As a result, the user-A 308 is not permitted to use the dataset-B 316 for search queries. More specifically, if the user-A 308 initiates a search query for images of the user-B 310 in the media collection-A 318, the service provider system 104 does not return any results. Because the device-A 302 did not provide the appropriate digital key to the API 128, the API 128 is not able to identify which user-specific dataset 124 to use for comparison with the indexed media information 118.

Similarly, if the user-A 308 chooses to revoke access to the dataset-A 314 from the user-C 312, the user-A 308 can enter a command to cause the privacy-control module 108 to delete the previously-shared key A2 at the service provider system 104 (and at the device-A 302). Then, when the device-C 306 performs a subsequent query search, using the key A2, of the media collection-C 322 for images or videos showing the user-A 308, the service provider system 104 returns no results, regardless of whether similar search queries previously provided results. Accordingly, the device-C is essentially blocked from performing a user-specific search for images or videos depicting the user-A 308.

Further in the illustrated example, the user-C 312 has not chosen to store a user-specific dataset 124 at the service provider system 104. Therefore, neither the device-A 302 nor the device-B 304 can obtain results of a search query for images and/or videos of the user-C 312.

Figure 4:
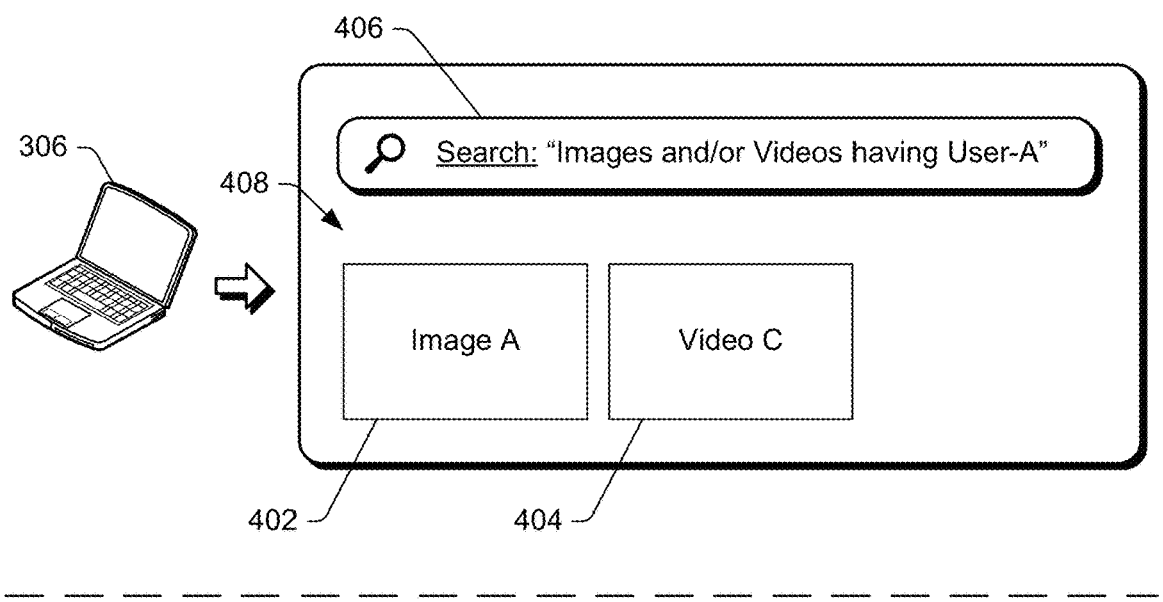
FIG. 4 depicts example search results of user-specific search queries according to the techniques described herein.
Figure 4:
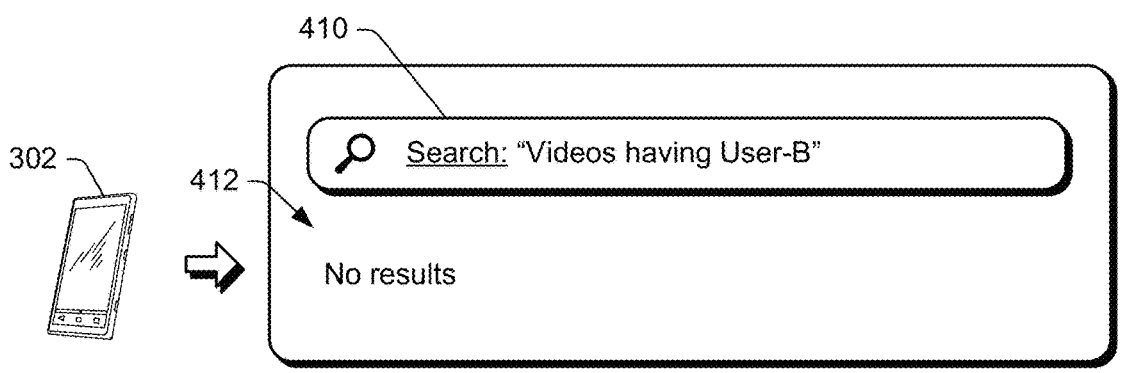

Continuing with the example illustrated in FIG. 3, FIG. 4 depicts example search results of user-specific search queries, according to the techniques described herein. In FIG. 4, an index 400 includes example indexed information (e.g., indexed media information 118), which indicates that an image A 402 contains the user-A 308 and the user-B 310, an image B contains the user-B 310, and a video C 404 includes the user-A 308 in frames X-Y and the user-B 310 in frames Q-Z.

The user-C 312 of the device-C 306 enters a search query in a search bar 406 for "images and/or videos having user-A." The device-C 306 transmits the search query to the API 128 along with the appropriate shared keys (e.g., the key A2 shown in the shared keys 330 of FIG. 3). The API 128 uses the shared key A2 to identify the corresponding user-specific dataset 124 (e.g., the dataset-A 314) to compare with the index 400. Based on this comparison, the API 128 returns search results 408 including the image A 402 and the video C 404.

In another example, the user-A 308 of the device-A 302 enters a search query in a search bar 410 for "videos having user-B." Here, no results are provided in search pane 412 because the device-A 302 cannot provide, with the search query, a shared key corresponding to the dataset-B 316 of the user-B 310, such as a copy of one of the owned keys 326 of the user-B 310.

EXAMPLE METHODS

Figure 5:
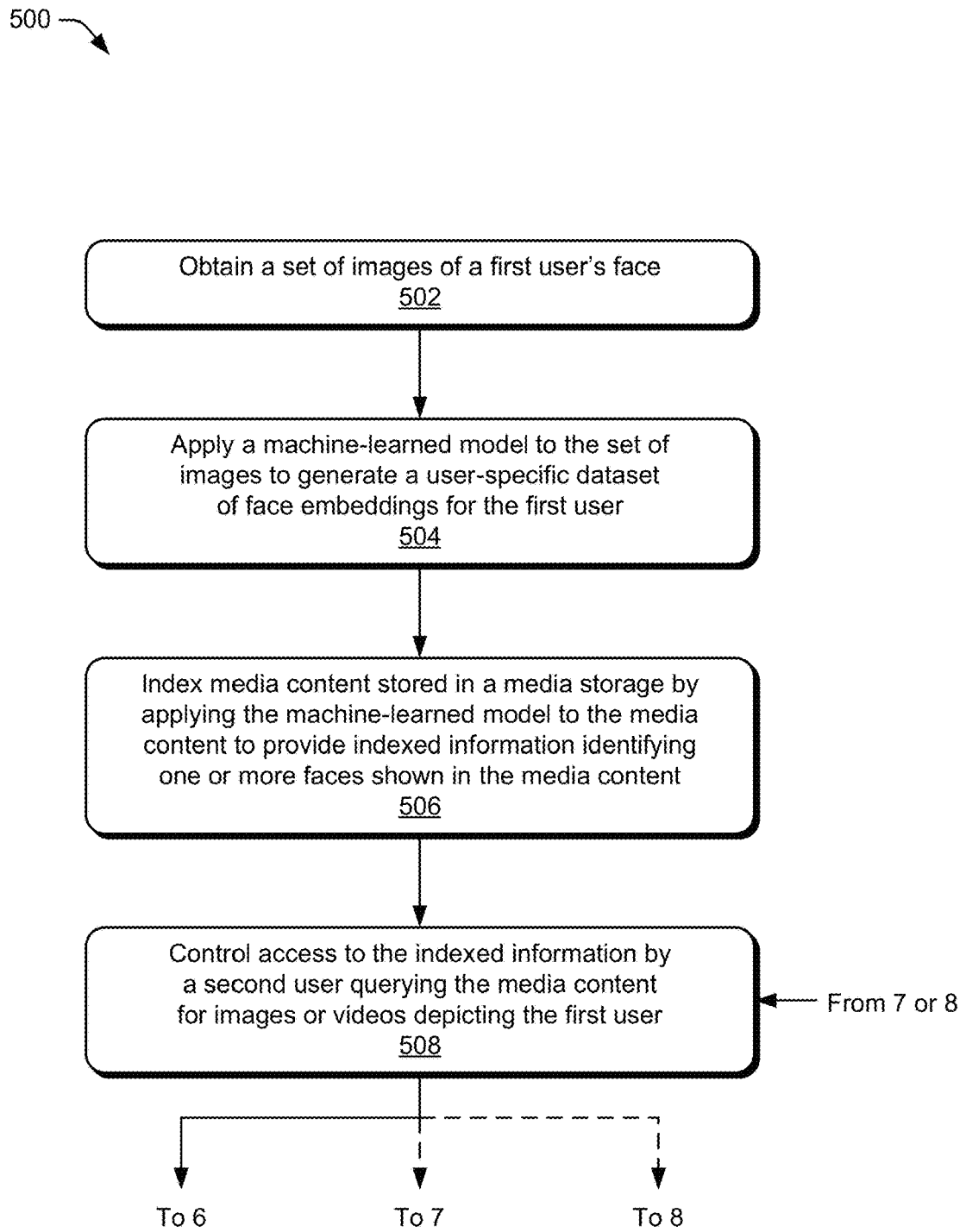
FIG. 5 depicts an example method for controlling privacy for sharing embeddings for searching and indexing media content.
Figure 6:
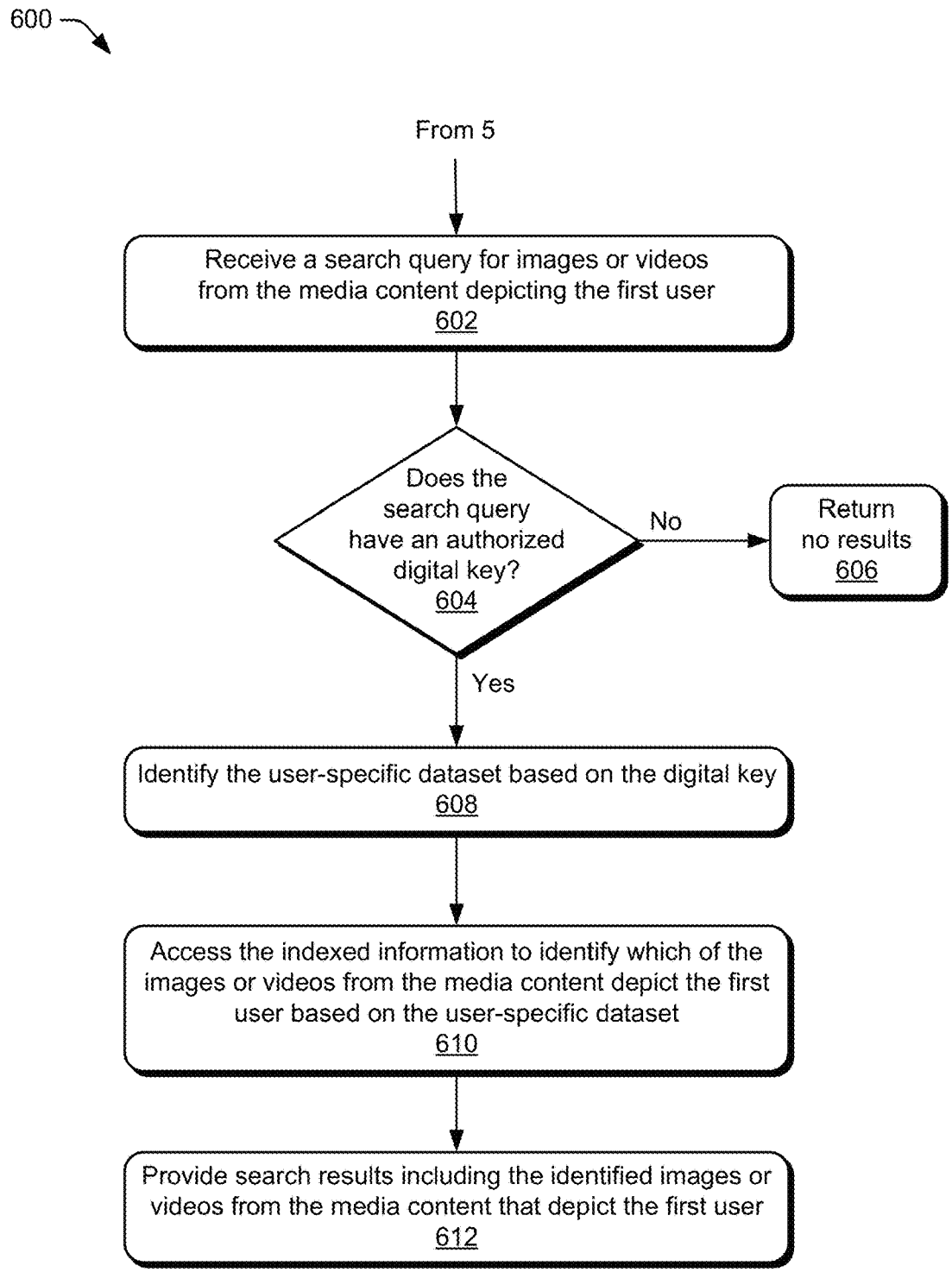
FIG. 6 describes additional details of the method in FIG. 5, which include a method for controlling access to the media content for user-specific search queries.
Figure 7:
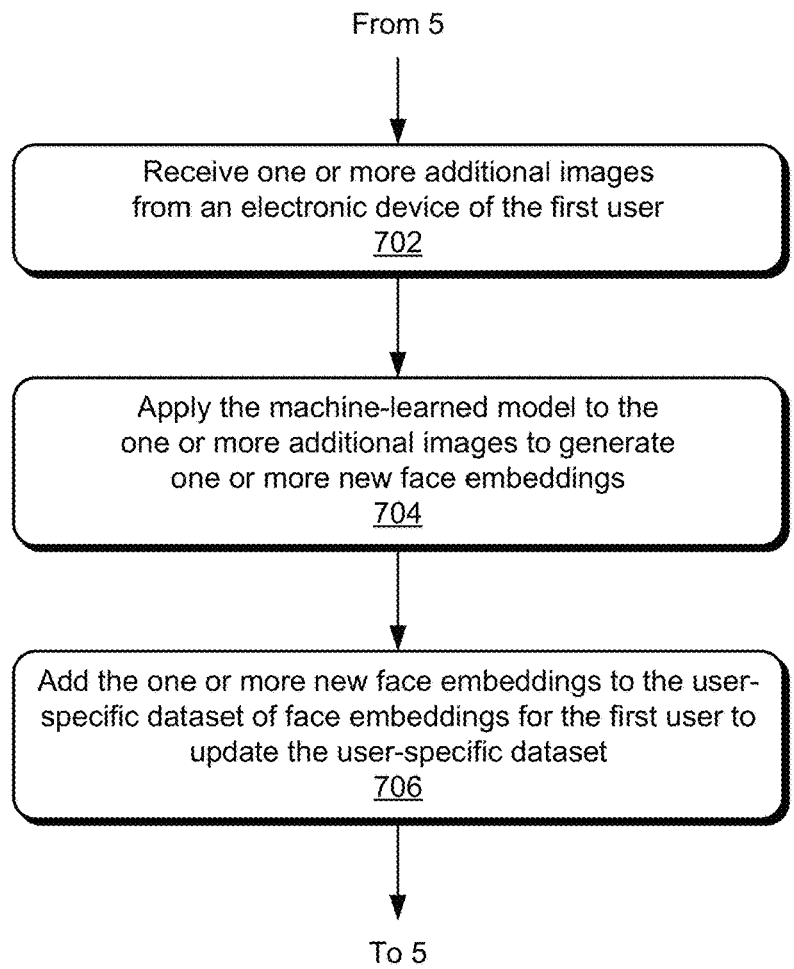
FIG. 7 describes additional details of the method in FIG. 5, which include a method of updating the user-specific dataset based on additional data.
Figure 8:
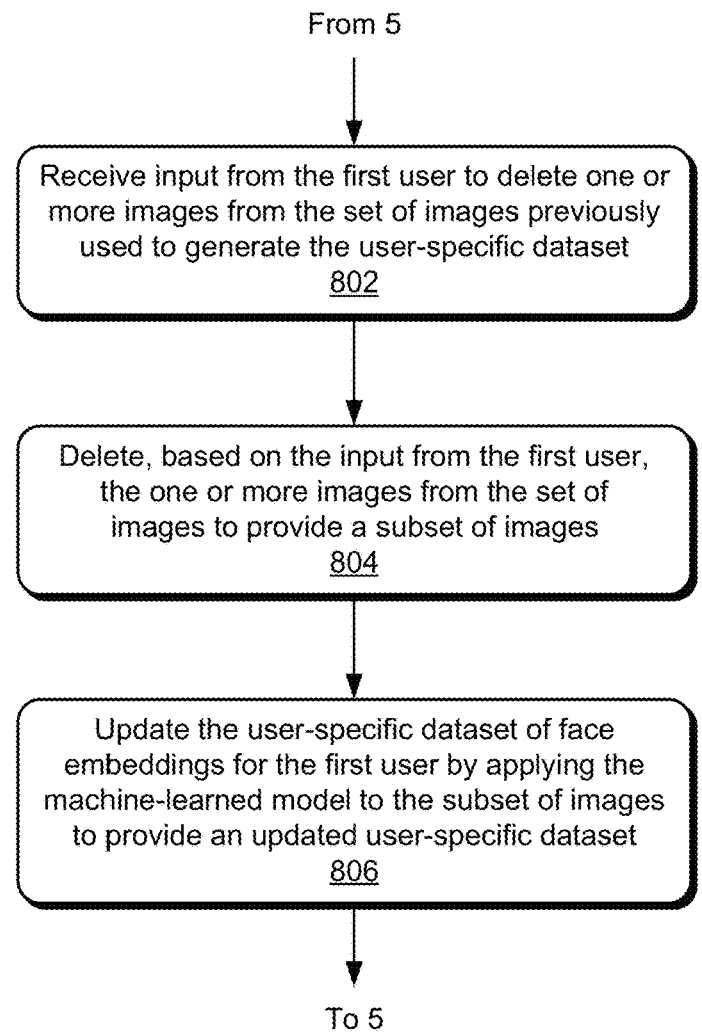
FIG. 8 describes additional details of the method in FIG. 5, which include method of updating the user-specific dataset based on data removal.

FIGS. 5 through 8 depict example methods 500, 600, 700, and 800 for controlling privacy for sharing embeddings for searching and indexing media content. These methods can be performed by the service provider system 104, which uses the search manager module 126 to control access to searching an image or video corpus using a user-specific query. FIG. 5 depicts a method of indexing media content based on a user-specific dataset. FIG. 6 describes additional details of the method 500 in FIG. 5, which include a method 600 for controlling access to the media content for user-specific search queries. FIG. 7 describes additional details of the method 500 in FIG. 5, which include a method 700 of updating the user-specific dataset based on additional data. FIG. 8 describes additional details of the method 500 in FIG. 5, which include method 800 of updating the user-specific dataset based on data removal.

The methods 500, 600, 700, and 800 are shown as sets of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to the example operating environment 100 of FIG. 1 or to entities or processes as detailed in FIGS. 2-4, reference to which is made for example only. The techniques are not limited to performance by one entity or multiple entities operating on one device.

At 502, a service provider system obtains a set of images of a first user's face. For example, the service provider system 104 can obtain the set of images from the electronic device 102.

At 504, the service provider system applies a machine-learned model to the set of images to generate a user-specific dataset of face embeddings for the first user. For example, the service provider system 104 can apply the machine-learned model 122 to the set of images to generate the user-specific dataset 124 for the user of the electronic device 102.

At 506, the service provider system indexes media content stored in a media storage by applying the machine-learned model to the media content to provide indexed information identifying one or more faces shown in the media content. For example, the service provider system 104 can index the media storage 116 stored at the service provider system 104 by applying the user-specific dataset 124 to media content in the media storage 116 and identifying images or videos that depict the user of the electronic device 102, which provides the indexed media information 118.

At 508, the service provider system controls access to the indexed information by a second user querying the media content for images or videos depicting the first user. For example, the service provider system 104 can implement the search manager module 126 for controlling access to the indexed media information 118. The search manager module includes the API 128, which acts as an intermediary between a user device (e.g., the electronic device 102, the user device 132) and the secure data stored at the service provider system 104. If the second user provides an authorized digital key, the API 128 accesses the indexed media information 118 and, using the user-specific dataset 124 corresponding to the digital key, identifies matching embeddings in the indexed media information 118, which indicate particular images or videos in the media storage 116 that depict the first user. The method 500 may optionally proceed to any one of the methods 600, 700, or 800 described with respect to FIGS. 6-8, respectively.

FIG. 6 describes additional details of the method 500 depicted in FIG. 5, which include a method 600 of controlling access to the media content for user-specific search queries. At 602, a service provider system receives a search query for images or videos from media content depicting a first user. For example, the service provider system 104 receives a search query from the requesting user device 132 for images or videos depicting the first user of the electronic device 102. The search query includes a digital key that was previously shared with a second user of the requesting user device 132 by the first user of the electronic device 102. The search query also includes an indication of a particular media storage (e.g., personalized media collection in the media storage 116, the media storage 136 at the media storage service 134, local storage at the user device 132).

At 604, the service provider system determines, using a search manager module having an application programming interface (API), whether the search query has an authorized digital key. For example, the API 128 determines whether the digital key provided in the search query matches one of the digital keys 112 associated with the first user.

If the API determines that the digital key is not authorized ("NO" at 604), then at 606 the service provider system returns no results to the search query. For example, the digital key 112 may have been deleted based on input from the first user, which results in the digital key 112 no longer being authorized for the search. In some cases, the search query may not include a digital key.

If the API determines that the digital key is authorized ("YES" at 604), then at 608, the API identifies the user-specific dataset based on the digital key. For example, the API 128 uses the digital key 112 to locate the user-specific dataset 124 for the first user, which provides an indication as to which face to search for in the media storage 116.

At 610, the API accesses the indexed information to identify which of the images or videos from the media content depict the first user based on the user-specific dataset. For example, the API 128 uses the face embeddings in the user-specific dataset 124 for comparison to the indexed media information 118. The indexed media information 118 includes embeddings associated with faces in the media storage 116. Accordingly, embeddings in the indexed media information 118 that match the face embeddings in the user-specific dataset 124 direct the API 128 to images or videos in the media storage that depict the first user.

At 612, the service provider system provides search results including the identified images or videos from the media content that depict the first user. For example, the service provider system 104 transmits, to the requesting user device 132, the identified images or videos depicting the first user as search results for the search query.

FIG. 7 describes additional details of the method 500 in FIG. 5, which include a method 700 of updating the user-specific dataset based on additional data. At 702, the service provider system receives one or more additional images from an electronic device of the first user. For example, the electronic device 102 may upload one or more new images that depict the user's face, such as a close-up photo or a full-body photo.

At 704, the service provider system applies the machine-learned model to the one or more additional images to generate one or more new face embeddings. At 706, the service provider system adds the one or more new face embeddings to the user-specific dataset of face embeddings for the first user to update the user-specific dataset. Additional embeddings can improve the user-specific dataset to enable more accurate results (e.g., more accurate identification of the user in the images or videos) than with less embeddings. The method 700 then returns to 508 in FIG. 5 to control access to the indexed information.

FIG. 8 describes additional details of the method 500 in FIG. 5, which include a method 800 of updating the user-specific dataset based on data removal. At 802, the service provider system receives input from the first user to delete one or more images from the set of images previously used to generate the user-specific dataset. For example, the first user may select to remove or delete one or more of the images that were used to generate the user-specific dataset 124. The user may dislike a specific image or the image may be an old image that is no longer a good representation of the user's current facial features.

At 804, the service provider system deletes, based on the input from the first user, the one or more images from the set of images to provide a subset of images. For example, the storage service module 120 of the service provider system 104 deletes images selected by the user for removal.

At 806, the service provider system updates the user-specific dataset of face embeddings for the first user by applying the machine-learned model to the subset of images to provide an updated user-specific dataset. To update the user-specific dataset 124 when the set of images is reduced, the storage service module 120 can recreate the user-specific dataset 124. Alternatively, the storage service module 120 can delete an embedding, from the user-specific dataset 124, that corresponds to the deleted image. For multiple deleted images, multiple corresponding embeddings can be deleted from the user-specific dataset 124. The method 700 then returns to 508 in FIG. 5 to control access to the indexed information. In at least some aspects, the methods 700 and 800 can be combined such that the user-specific dataset can be updated based on both the addition and removal of images used to generate the user-specific dataset.

Figure 9:
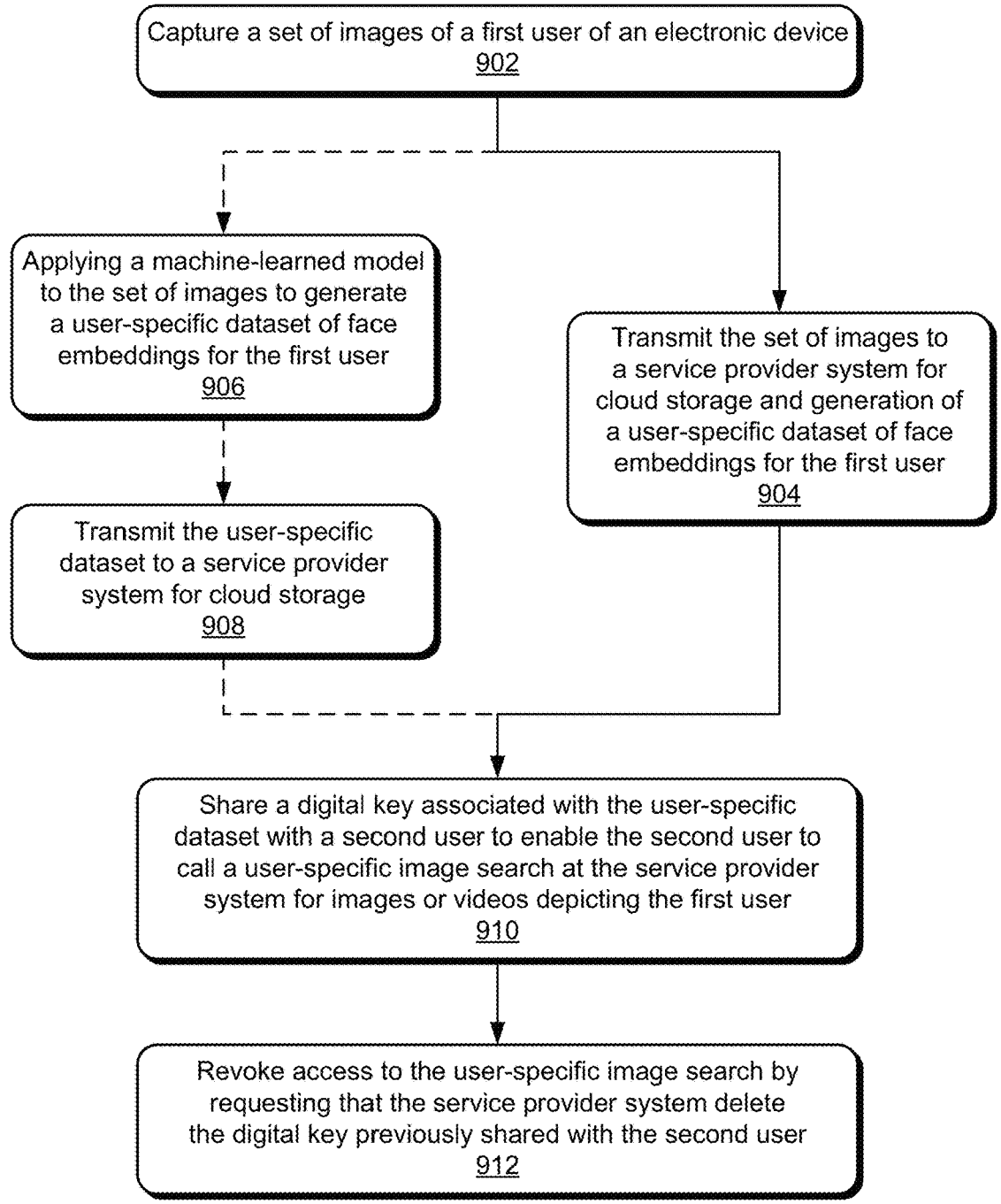
FIG. 9 depicts an example method for controlling privacy for sharing embeddings for searching and indexing media content.

FIG. 9 depicts an example method 900 for controlling privacy for sharing embeddings for searching and indexing media content. The method 900 can be performed by the electronic device 102, which uses the privacy-control module 108 to control access to searching an image or video corpus using a user-specific query.

The method 900 is shown as a set of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to the example operating environment 100 of FIG. 1 or to entities or processes as detailed in FIGS. 2-4, reference to which is made for example only. The techniques are not limited to performance by one entity or multiple entities operating on one device.

At 902, an electronic device captures a set of images of a first user of the electronic device. For example, the first user of the electronic device 102 may capture images (e.g., "selfies") using the camera system 214. The images may be captured using a color camera of the camera system 214. Alternatively, the images can be captured using a near-infrared camera of the camera system 214, such as during a face authentication process of the authentication system 212.

According to one option at 904, the electronic device transmits the set of images to a service provider system for cloud storage and generation of a user-specific dataset of face embeddings for the first user. For example, the electronic device 102 uploads the set of images to the service provider system 104 for secure storage in the media storage 116.

As an alternative to transmitting the set of images to the service provider system at 904, at 906 the electronic device may optionally apply a machine-learned model to the set of images to generate a user-specific dataset of face embeddings for the first user. For example, the electronic device 102 may apply the machine-learned model 122, which is stored at the electronic device 102, to the set of images. The machine-learned model 122 may be part of a face authentication system (e.g., authentication system 212) used to create face embeddings from captured images of the user to authenticate the user against enrolled embeddings to unlock the electronic device 102. The machine-learned model 122 can generate the user-specific dataset 124 of face embeddings based on the set of images.

At 908, the electronic device transmits the user-specific dataset to a service provider system for cloud storage. For example, the electronic device 102 may transmit the user-specific dataset 124, rather than the set of images, to the service provider system 104.

At 910, whether proceeding from 904 or 908, the electronic device shares a digital key associated with the user-specific dataset with a second user to enable the second user to call a user-specific image search at the service provider system for images or videos depicting the first user. The user of the electronic device 102 can share a digital key 112 with a friend to enable the friend to search the media storage 116 for images or videos depicting the user. For each friend of the user, a different digital key is provided.

At 912, the electronic device revokes access to the user-specific image search by requesting that the service provider system delete the digital key previously shared with the second user. For example, the user of the electronic device 102 can revoke the access previously provided to the friend by deleting the digital key that was shared with the friend. Consequently, the friend is no longer authorized to conduct a search using the user-specific dataset 124 of the user to find images or videos depicting the user.

Generally, any of the components, modules, methods, and operations described herein can be implemented using software, firmware, hardware (e.g., fixed logic circuitry), manual processing, or any combination thereof Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

EXAMPLE COMPUTING SYSTEM

Figure 10:
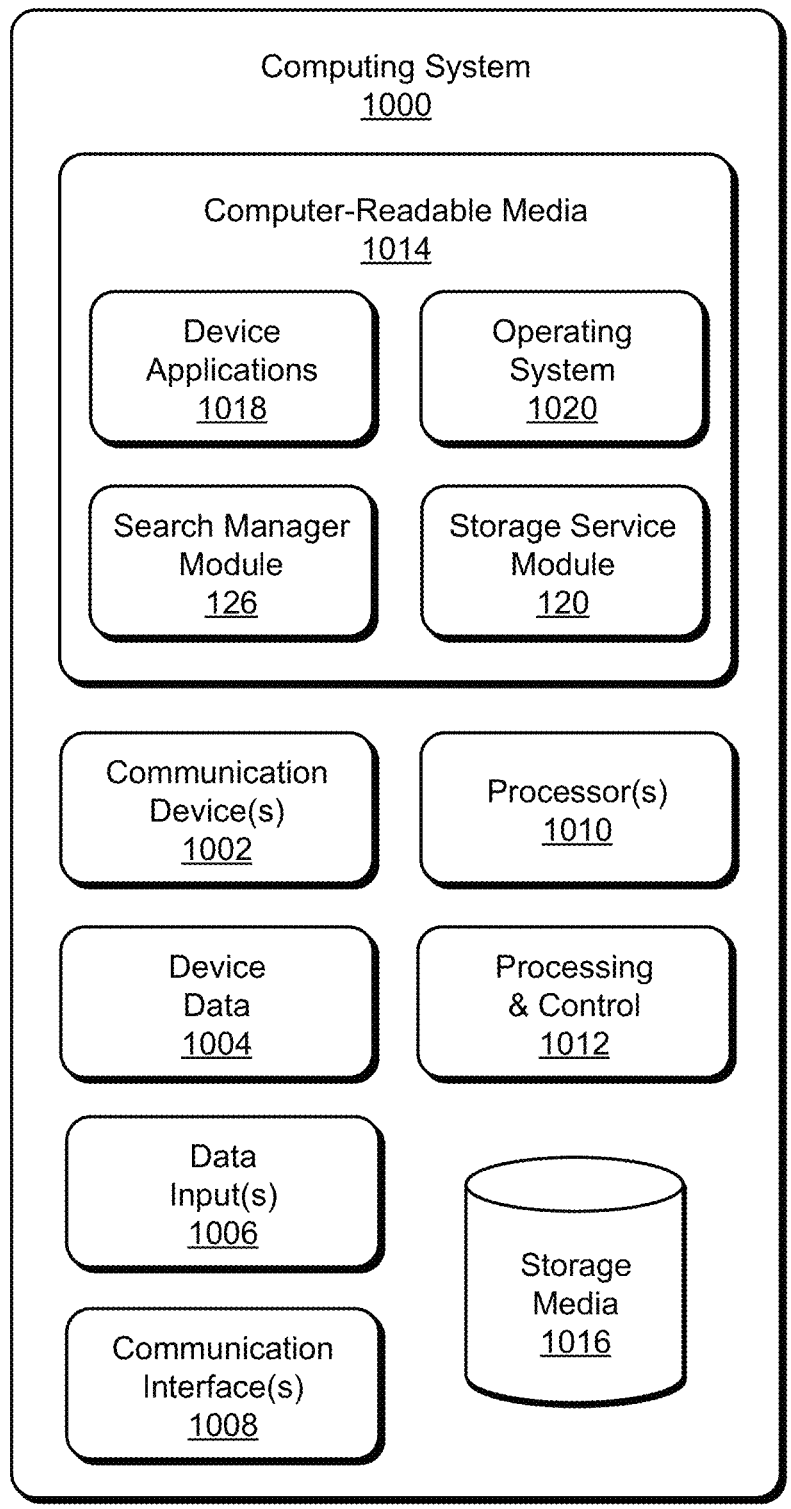
FIG. 10 illustrates an example computing system that can be implemented as any type of client, server, and/or electronic device as described with reference to FIGS. 1-9 to implement, or in which techniques may be implemented that enable, privacy controls for sharing embeddings for searching and indexing media content.

FIG. 10 illustrates various components of an example computing system 1000 that can be implemented as any type of client, server, and/or electronic device as described with reference to the previous FIGS. 1-9 to implement privacy controls for sharing embeddings for searching and indexing media content.

The computing system 1000 includes communication devices 1002 that enable wired and/or wireless communication of device data 1004 (e.g., radar data, authentication data, reference data, received data, data that is being received, data scheduled for broadcast, and data packets of the data). The device data 1004 or other device content can include configuration settings of the device, media content stored on the device, and/or information associated with a user of the device (e.g., an identity of a person within a radar field or customized air gesture data). Media content stored on the computing system 1000 can include any type of radar, biometric, audio, video, and/or image data. The computing system 1000 includes one or more data inputs 1006 via which any type of data, media content, and/or inputs can be received, such as human utterances, interactions with a radar field, touch inputs, user-selectable inputs or interactions (explicit or implicit), messages, music, television media content, recorded video content, and any other type of audio, video, and/or image data received from any content and/or data source.

The computing system 1000 also includes communication interfaces 1008, which can be implemented as any one or more of a serial and/or a parallel interface, a wireless interface, any type of network interface, a modem, and as any other type of communication interface. The communication interfaces 1008 provide a connection and/or communication links between the computing system 1000 and a communication network by which other electronic, computing, and communication devices communicate data with the computing system 1000.

The computing system 1000 includes one or more processors 1010 (e.g., any of microprocessors, controllers, or other controllers) that can process various computer-executable instructions to control the operation of the computing system 1000 and to enable techniques for, or in which can be implemented, privacy controls for sharing embeddings for searching and indexing media content. Alternatively or additionally, the computing system 1000 can be implemented with any one or combination of hardware, firmware, or fixed logic circuitry that is implemented in connection with processing and control circuits, which are generally identified at 1012. Although not shown, the computing system 1000 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 1000 also includes computer-readable media 1014, such as one or more memory devices that enable persistent and/or non-transitory data storage (in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. The computing system 1000 can also include a mass storage media device (storage media) 1016.

The computer-readable media 1014 provides data storage mechanisms to store the device data 1004, as well as various device applications 1018 and any other types of information and/or data related to operational aspects of the computing system 1000. For example, an operating system 1020 can be maintained as a computer application with the computer-readable media 1014 and executed on the processors 1010. The device applications 1018 may include a device manager, such as any form of a control application, software application, signal-processing and control modules, code that is native to a particular device, an abstraction module, an air gesture recognition module, and other modules. The device applications 1018 may also include system components, engines, modules, or managers to implement privacy controls for sharing embeddings for searching and indexing media content, such as the storage service module 120 or the search manager module 126. The computing system 1000 may also include, or have access to, one or more machine-learning systems.

Some examples are described below:

Example 1. A method of controlling privacy for sharing embeddings for searching and indexing media content, the method performed by a service provider system: obtaining a set of images of a face of a first user; applying a machine-learned model to the set of images to generate a user-specific dataset of face embeddings for the first user; indexing media content stored in a media storage by applying the machine-learned model to the media content to provide indexed information identifying one or more faces shown in the media content; and controlling, by an application programming interface, access to the indexed information by a second user querying the media content for images or videos depicting the first user, the access controlled based on a digital key shared by the first user with the second user, the digital key associated with the user-specific dataset, the user-specific dataset usable for comparison with the indexed information to identify the images or videos in the media content that depict the first user.

Example 2. The method of example 1, wherein the user-specific dataset is securely encrypted and inaccessible by the second user.

Example 3. The method of any preceding example, wherein the set of images includes a plurality of color images.

Example 4. The method of any preceding example, further comprising: receiving a search query for images or videos from the media content depicting the first user, the search query including the digital key associated with the user-specific dataset; accessing, by the application programming interface and using the digital key, the indexed information to identify which of the images or videos from the media content depict the first user; and providing search results including the identified images or videos from the media content that depict the first user.

Example 5. The method of example 4, further comprising: identifying the user-specific dataset based on the digital key; and searching the indexed information for one or more embeddings that match one or more face embeddings in the user-specific dataset.

Example 6. The method of example 4 or 5, wherein the identified videos include one or more frames in the identified video that depict the first user's face.

Example 7. The method of any preceding example, wherein the media storage is owned by a third-party entity.

Example 8. The method of any preceding example, further comprising: receiving one or more additional images from an electronic device of the first user; and updating the user-specific dataset of face embeddings for the first user by: applying the machine-learned model on the one or more additional images to generate one or more new face embeddings; and adding the one or more new embeddings to the user-specific dataset of face embeddings for the first user.

Example 9. The method of any preceding example, further comprising: deleting, based on user input from the first user, one or more images from the set of images previously used to generate the user-specific dataset, the deleting providing a subset of images; and updating the user-specific dataset of face embeddings for the first user by applying the machine-learned model to the subset of images to generate an updated user-specific dataset.

Example 10. The method of any preceding example, further comprising using a face detector to detect a face boundary of each face in the set of images.

Example 11. The method of any preceding example, further comprising maintaining a set of digital keys shared by the first user with other users, each digital key in the set of digital keys shared with a different user.

Example 12. The method of any preceding example, wherein: the media content includes a media collection associated with the second user; and the method further comprises searching the media collection associated with the second user for the images or videos depicting the first user.

Example 13. The method of any preceding example, further comprising: receiving a user selection to delete the digital key shared by the first user with the second user; receiving a subsequent search query from an electronic device of the second user, the subsequent search query including the digital key shared by the first user; and returning no results to the search query based on a determination that the digital key is not included in a set of digital keys associated with the user-specific dataset for the first user.

Example 14. The method of any preceding example, further comprising: receiving a second search query from a third user for images or videos from the media content depicting the first user, the second search query not including the digital key associated with the user-specific dataset; and returning no results to the second search query.

Example 15. A service provider system comprising: a media storage; a storage service module for managing data stored in the media storage; a machine-learned model for generating user-specific datasets of face embeddings for particular users; and a processor and memory for implementing the method of any preceding example.

CONCLUSION

Although implementations of techniques for, and apparatuses enabling privacy controls for sharing embeddings for searching and indexing media content have been described in language specific to features and/or methods, it is to be understood that the subject of the appended claims is not necessarily limited to the specific features or methods described. Rather, the specific features and methods are disclosed as example implementations of privacy controls for sharing embeddings for searching and indexing media content.

What is claimed is:

1. A method of controlling privacy for sharing embeddings for searching and indexing media content, the method performed by a service provider system:
obtaining a set of images of a face of a first user;
applying a machine-learned model to the set of images to generate a user-specific dataset of face embeddings for the first user;
indexing media content stored in a media storage by applying the machine-learned model to the media content to provide indexed information identifying one or more faces shown in the media content; and
controlling, by an application programming interface, access to the indexed information by a second user querying the media content for images or videos depicting the first user, the access controlled based on a digital key shared by the first user with the second user, the digital key associated with the user-specific dataset, the user-specific dataset usable for comparison with the indexed information to identify the images or videos in the media content that depict the first user;
receiving a search query for images or videos from the media content depicting the first user, the search query including the digital key associated with the user-specific dataset;
accessing, by the application programming interface and using the digital key, the indexed information to identify which of the images or videos from the media content depict the first user; and
providing search results including the identified images or videos from the media content that depict the first user.

2. The method of claim 1, wherein the user-specific dataset is securely encrypted and inaccessible by the second user.

3. The method of claim 1, wherein the set of images includes a plurality of color images.

4. The method of claim 1, further comprising:
identifying the user-specific dataset based on the digital key; and
searching the indexed information for one or more embeddings that match one or more face embeddings in the user-specific dataset.

5. The method of claim 1, wherein the identified videos include one or more frames in the identified video that depict the first user's face.

6. The method of claim 1, further comprising:
receiving one or more additional images from an electronic device of the first user; and
updating the user-specific dataset of face embeddings for the first user by:
applying the machine-learned model on the one or more additional images to generate one or more new face embeddings; and
adding the one or more new embeddings to the user-specific dataset of face embeddings for the first user.

7. The method of claim 1, further comprising:
deleting, based on user input from the first user, one or more images from the set of images previously used to generate the user-specific dataset, the deleting providing a subset of images; and
updating the user-specific dataset of face embeddings for the first user by applying the machine-learned model to the subset of images to generate an updated user-specific dataset.

8. The method of claim 1, further comprising using a face detector to detect a face boundary of each face in the set of images.

9. The method of claim 1, further comprising maintaining a set of digital keys shared by the first user with other users, each digital key in the set of digital keys shared with a different user.

10. The method of claim 1, wherein:
the media content includes a media collection associated with the second user; and the
method further comprises searching the media collection associated with the second user for the images or videos depicting the first user.

11. The method of claim 1, further comprising:
receiving a user selection to delete the digital key shared by the first user with the second user;
receiving a subsequent search query from an electronic device of the second user, the subsequent search query including the digital key shared by the first user; and
returning no results to the search query based on a determination that the digital key is not included in a set of digital keys associated with the user-specific dataset for the first user.

12. The method of claim 1, further comprising:
receiving a second search query from a third user for images or videos from the media content depicting the first user, the second search query not including the digital key associated with the user-specific dataset; and
returning no results to the second search query.

13. A service provider system comprising:
a media storage for storing media content;
a machine-learned model for generating user-specific datasets of face embeddings for particular users;
a processor; and
a memory storing computer-readable instructions that, when executed by the processor, cause the processor to:
obtain a set of images of a face of a first user;
apply a machine-learned model to the set of images to generate a user-specific dataset of face embeddings for the first user;
index the media content stored in the media storage by applying the machine-learned model to the media content to provide indexed information identifying one or more faces shown in the media content; and
control, by using an application programming interface, access to the indexed information by a second user querying the media content for images or videos depicting the first user, the access controlled based on a digital key shared by the first user with the second user, the digital key associated with the user-specific dataset, the user-specific dataset usable for comparison with the indexed information to identify the images or videos in the media content that depict the first user;
receiving a user selection to delete the digital key shared by the first user with the second user;
receiving a subsequent search query from an electronic device of the second user, the subsequent search query including the digital key shared by the first user; and
returning no results to the search query based on a determination that the digital key is not included in a set of digital keys associated with the user-specific dataset for the first user.

14. The service provider system of claim 13, wherein the computer-readable instructions further cause the processor to:
receive a search query for images or videos from the media content depicting the first user, the search query including the digital key associated with the user-specific dataset;
access, by using the application programming interface and the digital key, the indexed information to identify which of the images or videos from the media content depict the first user; and
provide search results including the identified images or videos from the media content that depict the first user.

15. The service provider system of claim 14, wherein the identified videos include one or more frames in the identified video that depict the first user's face.

16. The service provider system of claim 13, wherein the computer-readable instructions further cause the processor to:
receive one or more additional images from an electronic device of the first user; and
update the user-specific dataset of face embeddings for the first user by:
applying the machine-learned model on the one or more additional images to generate one or more new face embeddings; and
adding the one or more new embeddings to the user-specific dataset of face embeddings for the first user.

17. The service provider system of claim 13, wherein the computer-readable instructions further cause the processor to:
delete, based on user input from the first user, one or more images from the set of images previously used to generate the user-specific dataset, the deleting providing a subset of images; and
update the user-specific dataset of face embeddings for the first user by applying the machine-learned model to the subset of images to generate an updated user-specific dataset.

18. A method comprising:
capturing a set of images of a first user of an electronic device;
transmitting the set of images to a service provider system for cloud storage and generation of a user-specific dataset of face embeddings for the first user; and
sharing a digital key associated with the user-specific dataset with a second user to enable the second user to call a user-specific image search at the service provider system for images or videos depicting the first user;
receiving a search query for images or videos from media content depicting the first user, the search query including the digital key associated with the user-specific dataset;
accessing, by an application programming interface and using the digital key, indexed information to identify which of the images or videos from the media content depict the first user; and
providing search results including the identified images or videos from the media content that depict the first user.

19. The method of claim 18, further comprising:
revoking access to the user-specific image search by requesting that the service provider system delete the digital key previously shared with the second user, the deletion of the digital key effective to prevent the second user from conducting a search using the user-specific dataset of the first user to identify images or videos depicting the first user.

* * * * *